Figure 1:
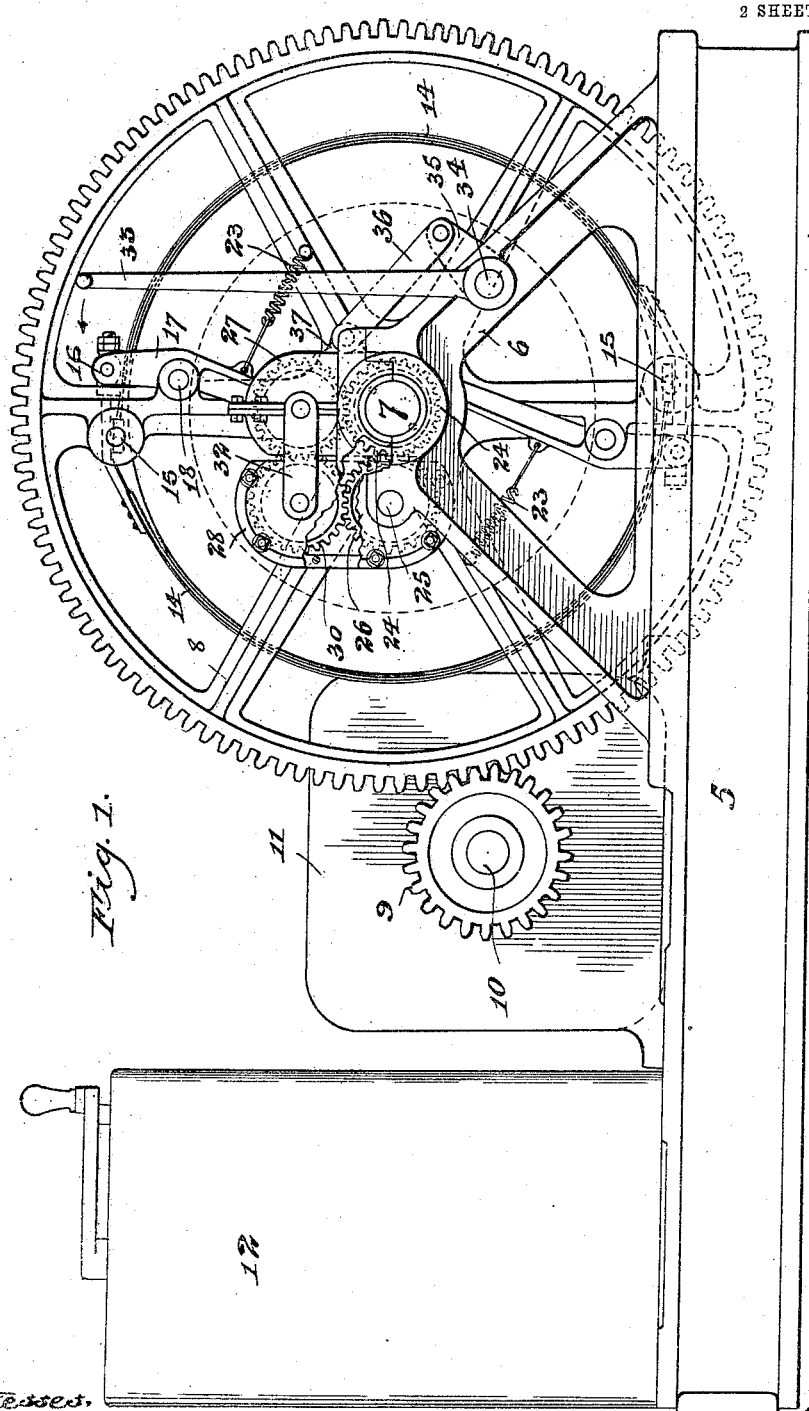

W. A. BARKER.
MECHANICAL MOVEMENT.
APPLICATION FILED OCT. 30, 1911.

1,033,776.

Patented July 30, 1912.

2 SHEETS—SHEET 1.

Witnesses.
Inventor,
Wendell A. Barker,
By Offield, Towle, Graves & Offield
Attys.

W. A. BARKER.
MECHANICAL MOVEMENT.
APPLICATION FILED OCT. 30, 1911.
1,033,776.
Patented July 30, 1912.
2 SHEETS—SHEET 2.
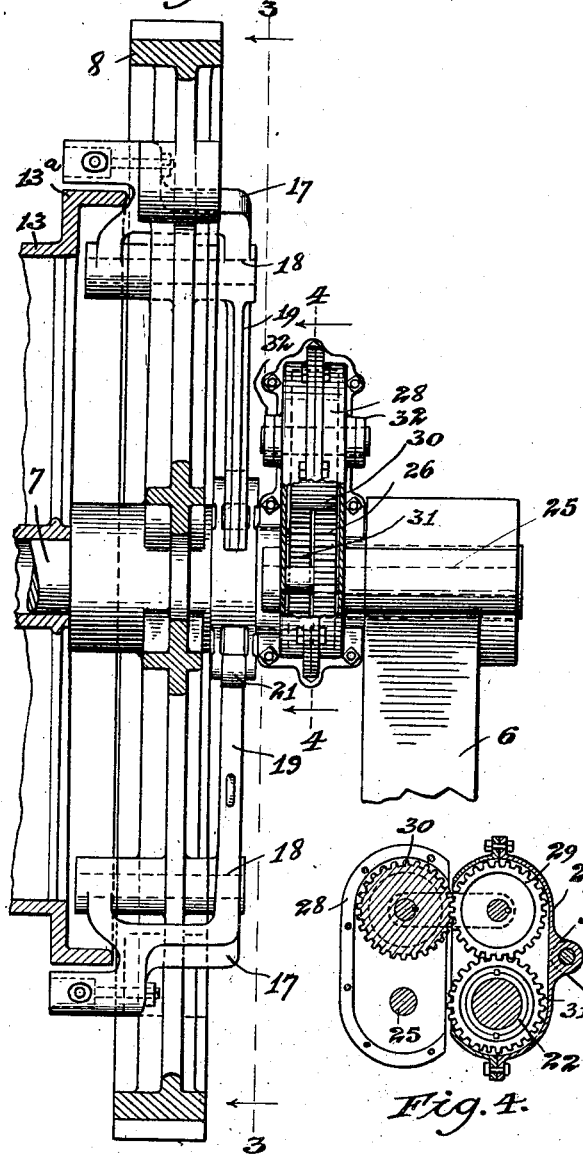
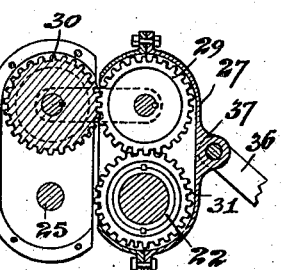
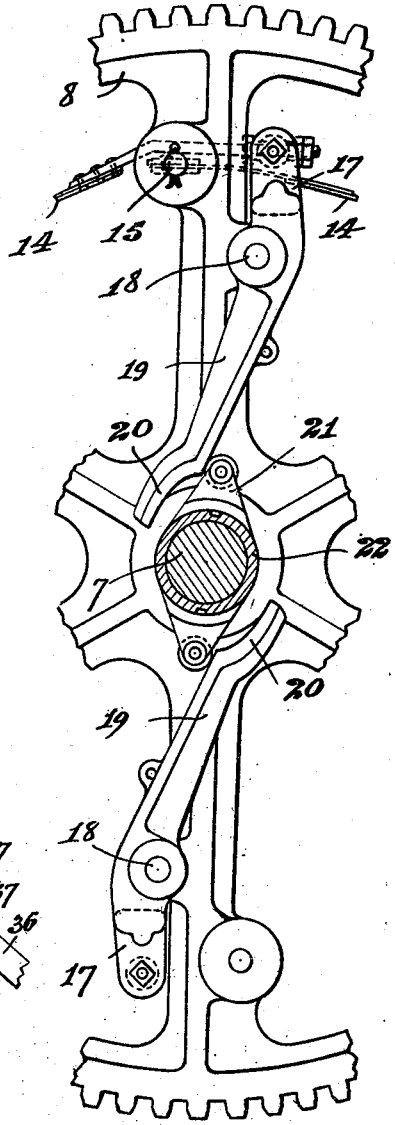

UNITED STATES PATENT OFFICE.

WENDELL A. BARKER, OF CHICAGO, ILLINOIS.

MECHANICAL MOVEMENT.

1,033,776.  Specification of Letters Patent.  Patented July 30, 1912.

Application filed October 30, 1911. Serial No. 657,404.

*To all whom it may concern:*

Be it known that I, WENDELL A. BARKER, a citizen of the United States, residing at Chicago, in the county of Cook and State of Illinois, have invented certain new and useful Improvements in Mechanical Movements, of which the following is a specification.

My invention relates to devices for transmitting motion, and has reference more particularly to a novel gearing adapted to effect an angular adjustment or shift of a continuously rotating member during and without interrupting its rotation and either in the direction of its rotation or in the opposite direction.

The device of my invention is capable of many useful applications, that for which it has been more especially designed being in connection with hoisting machines to effect the application of a friction band or bands carried by a continuously rotating wheel or disk to the periphery of the head of a winding drum; but it will be manifest that the device of my present invention is capable of being utilized in other relations and situations where it may be desired to effect an angular advance or retardation of a continuously rotating member without interrupting the movement of the latter for any purpose whatever.

In the accompanying drawings I have illustrated a mechanical movement of my invention, and, in order to present one instance of its practical utility, I have shown the same as applied to the friction-clutch of a hoisting-machine to effect the application and release of the friction band to the head of the winding-drum; and referring thereto—Figure 1 is a side elevational view of my present invention as applied to a hoisting-machine. Fig. 2 is an enlarged detail view partly in elevation broken out, and partly in vertical section of the main driving-wheel of the machine and the clutch-operating devices actuated by the device of my present invention. Fig. 3 is a fragmentary enlarged side elevation of the parts of Fig. 2 appearing to the left of the line 3—3 of the latter figure. Fig. 4 is a vertical sectional detail on the line 4—4 of Fig. 2.

Referring to the drawings, and first briefly describing the parts of a hoisting-machine to which my present invention is shown as applied, 5 designates the machine bed carrying on either side a side frame 6, in the upper portion of which is suitably journaled a driven-shaft 7, fast on which latter is a large spider-gear 8 driven by a pinion 9 on the armature-shaft 10 of an electric-motor indicated at 11 and controlled by an ordinary electric controller 12. Loose on the shaft 7 is the winding-drum or spool of the hoisting-machine, a fragment of which is shown at 13 in Fig. 2. Coöperating with the head or flange 13ᵃ of the winding-drum are a pair of duplicate clutch-straps 14 mounted on the inner face of the large gear 8; each of these straps being anchored at one end, as shown at 15 and its other end being pivotally secured at 16 to the outer end of the short arm 17 of a lever that is pivoted at 18 to the gear-wheel 8, and has an inwardly extending inclined arm 19 terminating in a suitably curved or cam-shaped end portion 20, these latter being actuated to swing the levers and apply the friction-clutch straps to the head or flange of the drum when the latter is to be rotated by a yoke-member 21 (Fig. 3) that is fast on a sleeve 22 loose on the driven-shaft 7. The lever-arms 19 are normally held inwardly in a position in which the clutch-straps 14 are in non-driving relation to the drum by springs 23 (Fig. 1).

Turning now to those features wherein my present invention more particularly resides, 24 designates a driving gear that is fast on the driven-shaft 7.

25 designates a counter-shaft suitably journaled in the side frame member 6 alongside and parallel with the main driving-shaft 7. Fast on the counter-shaft 25 and meshing with the driving gear 24 is a gear 26 that constitutes one of a train of intermediate gears between the driving-gear 24 and a driven gear, hereinafter described, that is loose on the shaft 7 alongside the driving-gear 24. Pivotally mounted on the shafts 7 and 25, respectively, are a pair of gear-carriers 27 and 28, herein taking the form of gear-casings that are open on their proximate edges. In the upper portions of these pivoted gear-carriers 27 and 28 are journaled other intermediate gears 29 and 30 which mesh with each other, as best shown in Fig. 4. The gear 30 is a broad-faced gear, as is shown in Fig. 2, and meshes with and is driven by the underlying gear 26, said gear 30 in turn driving the intermediate gear 29. This latter gear 29 meshes with and drives a driven gear 31 (Fig. 4)

that is keyed to the sleeve 22 which latter, it will be remembered, is loose on the shaft 7 and carries the yoke or spreader 21. As the gears 24, 26, 30, 29 and 31 are all of the same diameter and have the same number of teeth, it follows that the driven gear 31 is rotated in the same direction and at the same speed as the driven shaft 7 and the driving gear 24 carried thereby. Hence, the yoke or spreader 21 normally rotates synchronously with the large gear 8 that carries the levers 17, 19, so that normally the yoke or spreader 21 exerts no effect upon the arms 19 of said levers.

The gear-carriers 27 and 28 are pivotally connected for simultaneous and equal angular movement about their respective pivot centers by a duplex link 32, and the gear-carrier 27 is connected to an actuating lever 33 through a rock-shaft 34 journaled in the frame 6, a crank-arm 35 on one end of said rock-shaft, and a link 36 connecting the outer end of crank-arm 35 with a lug 37 on gear-carrier 27. From this it will be evident that when the operating lever 33 is swung in the direction indicated by the arrow in Fig. 1, the gear-carriers 27 and 28 will be simultaneously and equally swung in the same direction about their pivotal centers, thus bodily displacing the pivot centers of the intermediate gears 30 and 29, and this results in an angular shift of the driven gear 31, while the latter is rotating, which swings the yoke 21 from the position shown in Fig. 3 to a position in which the lever arms 19 are spread by the sliding engagement of the ends of the yoke 21 with the cam extensions 20 of the lever arms 19. This instantly applies the friction-clutch straps to the winding drum, so that the latter is at once picked up by the large gear 8 and partakes of the rotary movement of the latter. The winding-drum is released from the grip of the clutch-straps 14 by simply returning the operating lever 33 to the normal position shown in Fig. 1, which, through the described mechanism, effects a return angular shift of the driven gear 31 and the yoke or spreader 21 fast therewith, permitting the springs 23 to draw the lever arms 19 inwardly and thus release the clutch-straps 14 from the drum.

The mechanism shown, when operating as described, effects an angular shift of the driven gear 31 and the yoke 21 carried thereby backwardly or in a direction opposite the direction of rotation; but it is manifest that if the centers of the gears 30 and 29 be shifted to the right in Fig. 1, instead of to the left, the opposite effect will be produced on the driven gear 31 and yoke 21, the angular shift in such case being forward or in the direction of rotation. It is manifest that the described mechanical movement for effecting angular advance or retardation of the continuously rotating gear 31 may be usefully applied to many other situations, such, for instance, as the shifting of an eccentric in an engine, and hence the present invention is concerned only with the novel means herein described and claimed for effecting an angular shift of a rotary driven member, and not with any particular application or use of such means.

I claim:

1. In combination, a driven gear, a counter-shaft, a gear thereon, means for driving said counter-shaft gear, a pair of gear-carriers pivotally mounted coaxially with said driven gear and counter-shaft, respectively, two intermediate gears journaled in said gear-carriers, respectively, and meshing with each other, one of said intermediate gears meshing with said driven gear and the other meshing with said counter shaft gear, and means for effecting a simultaneous angular movement of said gear-carriers about their respective pivot centers, substantially as described.

2. In combination, a driving shaft, a driving gear fast thereon, a driven gear coaxial with and rotatable relative to said shaft, a counter-shaft, an intermediate gear thereon meshing with said driving gear, a pair of gear-carriers pivotally mounted coaxially with said driving shaft and counter-shaft, respectively, two other intermediate gears journaled in said gear-carriers, respectively, and meshing with each other, one of said two other intermediate gears meshing with said first-named intermediate gear and the other meshing with said driven gear, and means for effecting a simultaneous angular movement of said gear-carriers about their respective pivot centers, substantially as described.

3. In combination, a driving shaft, a driving gear fast thereon and a driven gear loose thereon, a counter-shaft, an intermediate gear thereon meshing with said driving gear, a pair of gear-carriers pivotally mounted on said driving shaft and counter-shaft, respectively, two other intermediate gears journaled in said gear-carriers, respectively, and meshing with each other, one of said two other intermediate gears meshing with said first-named intermediate gear and the other meshing with said driven gear, and means for effecting a simultaneous angular movement of said gear-carriers about their respective pivot centers, substantially as described.

4. In combination, a driving shaft, a driving gear fast thereon and a driven gear loose thereon, a counter-shaft, an intermediate gear thereon meshing with said driving gear, a pair of gear-carriers pivotally mounted on said driving shaft and counter-shaft, respectively, two other intermediate gears journaled in said gear-carriers, respectively, and meshing with each other, one of said two other intermediate gears meshing with said first-named intermediate gear and the other meshing with said driven gear, a link pivotally connecting said gear-carriers for simultaneous and equal angular movement about their respective pivot centers, an operating lever, and connections between said lever and one of said gear-carriers for imparting an angular movement to the latter about its pivot center, substantially as described.

WENDELL A. BARKER.

Witnesses:
SAMUEL N. POND,
DAISY C. THORSEN.